United States Patent [19]

Acda

[11] 4,040,889
[45] Aug. 9, 1977

[54] APPARATUS FOR MANUFACTURING AN ELECTROWELDING COMPONENT OF SYNTHETIC MATERIAL COMPRISING A RESISTANCE ELEMENT

[75] Inventor: Petrus Marinus Acda, Enkhuizen, Netherlands

[73] Assignee: Polva Nederland,BV, Enkhuizen, Netherlands

[21] Appl. No.: 658,221

[22] Filed: Feb. 17, 1976

[30] Foreign Application Priority Data

Feb. 21, 1975 Netherlands ........................ 7502051

[51] Int. Cl.² ............................................. B32B 31/00
[52] U.S. Cl. ..................................... 156/498; 156/580
[58] Field of Search ................ 156/275, 580, 581, 498

[56] References Cited

U.S. PATENT DOCUMENTS

| 2,742,390 | 4/1956 | Beck | 156/275 |
|---|---|---|---|
| 3,049,465 | 8/1962 | Wilkins | 156/275 |
| 3,061,503 | 10/1962 | Gould et al. | 156/275 |
| 3,378,672 | 4/1968 | Blumenkranz | 156/275 |
| 3,406,055 | 10/1968 | Rubel | 156/275 |
| 3,506,519 | 4/1970 | Blumenkranz | 156/275 |

Primary Examiner—Douglas J. Drummond
Attorney, Agent, or Firm—Frank R. Trifari; David R. Treacy

[57] ABSTRACT

A method of and apparatus for the manufacture of an electrowelding component of synthetic material comprising a resistance element, in which in a first process phase the component is formed and in a second process phase the resistance element is fixed in place, the adhesion between component and element being achieved by heating the element by electrical energy.

1 Claim, 7 Drawing Figures

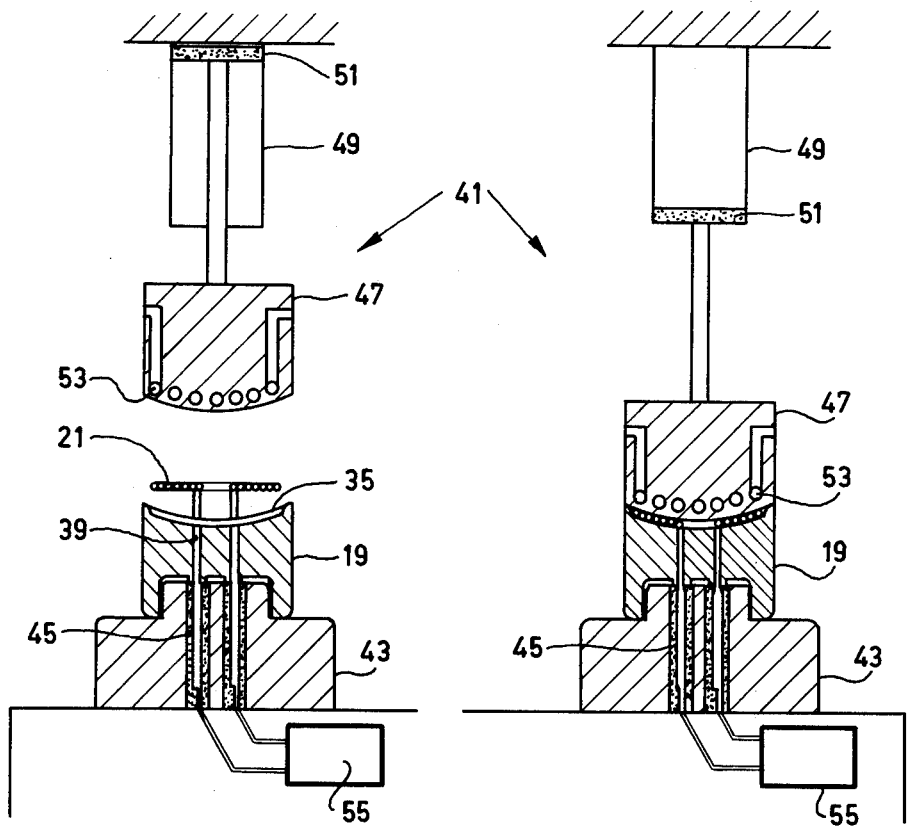
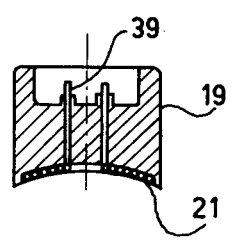
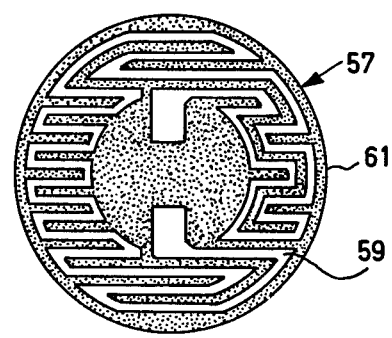
Fig.4    Fig.5    Fig.6    Fig.7

APPARATUS FOR MANUFACTURING AN ELECTROWELDING COMPONENT OF SYNTHETIC MATERIAL COMPRISING A RESISTANCE ELEMENT

The invention relates to a method of, an apparatus and for, manufacturing a component of synthetic material comprising a resistance element, a component being formed in a first process phase and subsequently in a second process phase a resistance element, provided with a layer of synthetic material, being embedded in the component.

Components of synthetic material, notably for pipe or tubular duct systems, can be connected to each other by means of the so-called electrowelding method which uses a resistance element provided between the parts to be connected. In order to simplify the assembly of the components of synthetic material during the installation of the duct system, to reduce the number of loose elements, and to prevent assembly errors, the resistance element is preferably provided on one of the components in advance.

In accordance with one such method which is known from Swiss Patent Specification 515,449, the component with the resistance element is placed in a mold having a cavity which is just large enough to accommodate the component with the resistance element; subsequently, the cavity is filled up with synthetic material by injection.

The object of the invention is to provide a simplified method of manufacturing a synthetic material component containing a resistant element, which does not require an expensive injection mold and for which a rather simple apparatus suffices.

In accordance with the invention during the second process phase heat is developed in the resistance element by the application of electrical energy, with the result that the layer of synthetic material of the resistance element is heated to a plastic state, and the resistance element is then fused with the component under pressure.

A preferred embodiment of apparatus for performing the method in accordance with the invention comprises a table having two sleeves of insulating material, a movable die which co-operates with the table, and a current source. The component is arranged on the table and the resistance element is arranged thereon, the connection pins of the element being inserted through the two sleeves. The resistance element is pressed onto the component by means of the die. The die and table have a very simple construction and can be inexpensively manufactured for components of various shapes.

In a further preferred embodiment of the apparatus in accordance with the invention, the die is provided with cooling ducts and is made of a material having a high heat conductively coefficient such as aluminum. The face of the resistance element which is remote from the component and which contacts the die should be heated only to a limited degree, because otherwise the resistance wire will be exposed. Due to the quick removal of heat via the cooled die, which is preferably made of aluminum, the temperature of the romote face of the resistance element remains below the melting temperature of the layer of synthetic material.

Components comprising a resistance element manufactured using the method in accordance with the invention are characterized by a regular appearance.

The resistance element can consist of a wire enveloped by a jacket of synthetic material or of a foil of synthetic material bonded to a punched conductor, the jacket or the synthetic foil then forming the said layer of synthetic material.

The invention will be described in detail hereinafter with reference to the drawing.

FIG. 4 shows an apparatus for performing the method according to the invention before fusing the element to the component part;

FIG. 5 shows the apparatus of FIG. 4 during the fusing step;

FIG. 6 is a sectional view of the component part of FIG. 2 with the resistance element and;

FIG. 7 shows a foil embodiment of the resistance element.

Figure 1:
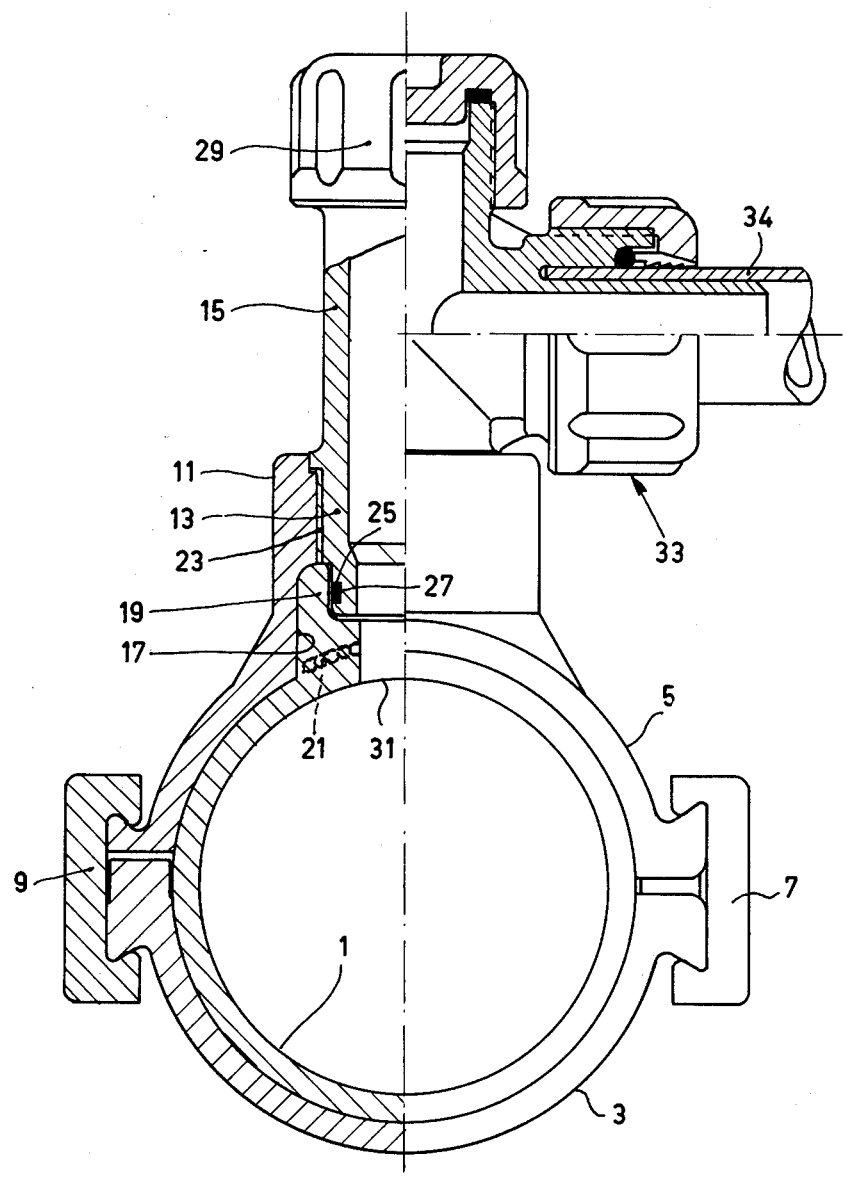
FIG. 1 is a sectional view of a pipe branch connection provided with a component comprising a resistance element and manufactured using the method according to the invention.

With reference to FIG. 1 a tubular duct 1 of polyethylene is provided within two shell-shaped saddle portions 3 and 5, for example, of polyvinylchloride, which are clamped on the tubular duct 1 by means of wedge-shaped clamping pieces 7 and 9 polyvinylchloride and which substantially enclose the tubular duct 1. The saddle portion 5 is provided with a tubular extension 11 which accommodates a portion 13 of a branch piece 15, preferably made of synthetic material. The portion 5 also has a recess 17 which encloses an insert 19 which has already been fused with the tubular duct in the embodiment shown. The insert 19 consists of high-density polyethylene and is connected to the tubular duct by the electrowelding method. To accomplish this welding, the insert is provided with a resistance element 21. In order to ensure that the pressure of the insert against the portion 5 is adequate for welding, the height of the insert 19 is chosen to be slightly larger than the height of the recess 17. The branch piece 15 is retained by a thread 23 on part of the portion 13 which engages a corresponding thread in the tubular portion 11. An unthreaded end of the portion 13 fits in a recess in the insert 19 and is provided with a groove 25 to accommodate a rubber O-ring 27. Obviously, such a groove can alternatively be made in the insert 19. The other end of the branch piece 15 is provided with a sealing plug 29 which closes the opening through which a cutter or drilling tool can be introduced to make the opening 31 in the tubular duct 1. The branch piece 15 further comprises at least one coupling 22 for accommodating a branch duct 34.

Figure 2:
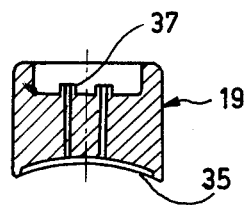
FIG. 2 is a sectional view of the component part without resistance element as shown in FIG. 1.

FIG. 2 shows, at a smaller scale, the cylindrical insert 19 as it is formed by injection molding, provided with a shallow recess 35 and two borings 37, and before it is assembled as a component to be electrowelded to the duct.

Figure 3:
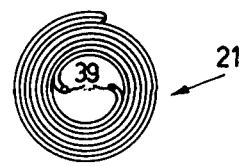
FIG. 3 shows the resistance element as shown in FIG. 1.

FIG. 3 shows the electrical resistance element 21, consisting of a resistance wire wound into a double spiral coil and provided with a covering of synthetic material, the two ends 39 of the wire being bent axially and free from synthetic material to act as connection pins.

FIG. 4 shows an apparatus 41 for performing the method according to the invention by fixing the electrical resistance element 21 in the recess 35 of the insert 19.

The apparatus includes a jig 43, whose shape along the top surface is adapted to locate and support the upper portion of the insert 19. The jig 43 is provided with two parallel sleeves 45 of insulating material for receiving electrical connection pins extending from the insert. A die 47 of aluminum is positioned above the jig, the die being movable up and down by means of a piston 51 arranged in a cylinder 49. The die is provided with a cooling duct 53 which is connected, via hoses not shown, to an inlet and an outlet for cooling water. The method is performed as follows: the upper side of the insert 19 is placed on the table 43. Subsequently, the resistance element 21 is arranged in the recess 35, the connection pins 39 then being inserted through the sleeves 45. The die 47 is moved downwards and to the active position shown in FIG. 5, the resistance element 21 being deformed and pressed into the recess 35 by the die. The connection pins 39 are subsequently connected to an electric power source 55.

A quantity of electrical energy is converted into heat by passing current through the resistance element 21 so that the jacket as well as the surface of the insert which contacts the resistance element are brought into a plastic state. Adhesion between the resistance element and insert is achieved by the pressure of the die. The minimum quantity of heat to be supplied by the resistance element is determined by the required adhesion. The maximum quantity of heat is determined by the part of the wire jacket which contacts the die; this part should not be brought into a plastic state, so that bare wire cannot become exposed to the die. The temperature of the die-contacting part of the jacket can be kept below the melting temperature by quickly removing heat via the die. Therefore, the die is made of a material having a relatively high coefficient of heat conductivity and is provided with a cooling duct.

FIG. 6 shows the finished product, consisting of the insert 19 with the electric resistance element 21 and the two projecting connection pins 39 which pins will subsequently be connected to a current source to effect the electric weld.

FIG. 7 shows a resistance element 57 in an other embodiment, consisting of printed or punched wiring 59 which is provided on a foil 61 of synthetic material. A resistance element of this kind is arranged in the device 41 such that the bare wiring 59 contacts the insert 19, while the synthetic foil 61 contacts the die 47.

The invention has been described with reference to a component in the form of an insert which forms part of a branch connection piece. However, the invention can also be applied for the manufacture of all sorts of components of synthetic material, in particular tubular and branch saddles, in which the resistance element is provided directly on the saddle. The method is especially, though not exclusively, suitable for the manufacture of components of high-density polyethylene, in which case the layer of synthetic material of the resistance element should preferably consist of the same material.

What is claimed is:

1. An apparatus for manufacturing an electrowelding component, comprising a jig having a surface shaped for locating and supporting said component, said jig comprising two sleeves of insulating material extending parallel to each other through said jig from said shaped surface and arranged for receiving electrical connection pins for a component to be assembled; a die having a pressure surface shaped so as to form a surface of the component, said die comprising a material having a high coefficient of heat conductivity, and having duct means for passing cooling medium therethrough; means for locating and moving said die with respect to said jig, and pressing said jig and said die toward each other; and electric energy means for passing electrical current through pins of a component placed in said sleeves.

* * * * *